United States Patent [19]

Brenneman et al.

[11] Patent Number: 4,750,175

[45] Date of Patent: Jun. 7, 1988

[54] NETWORK DIAGNOSTIC APPARATUS AND METHOD

[75] Inventors: William D. Brenneman, San Ramon; Robert D. Hodges, Concord, both of Calif.

[73] Assignee: Pactel Communications Companies, San Francisco, Calif.

[21] Appl. No.: 902,197

[22] Filed: Aug. 29, 1986

[51] Int. Cl.[4] .......................... G06F 11/08; H04L 1/24
[52] U.S. Cl. ......................... 371/22; 375/10; 379/25; 379/26
[58] Field of Search ............... 371/22, 15, 16; 375/10; 370/13, 14, 15, 17; 379/25, 26

[56] References Cited

U.S. PATENT DOCUMENTS

| | | | |
|---|---|---|---|
| 4,112,264 | 9/1978 | Abramson et al. | 324/83 A |
| 4,351,059 | 9/1982 | Gregoire | 371/22 X |
| 4,385,384 | 5/1983 | Rosbury | 371/22 |
| 4,425,625 | 1/1984 | Seligman et al. | 364/900 |
| 4,490,817 | 12/1984 | Turner | 370/17 |
| 4,561,090 | 12/1985 | Turner | 370/13 X |
| 4,653,070 | 3/1987 | Nakajima | 371/22 X |

Primary Examiner—Jerry Smith
Assistant Examiner—Robert W. Beausoliel
Attorney, Agent, or Firm—Fitch, Even, Tabin & Flannery

[57] ABSTRACT

A system for testing a data processing network and diagnosing malfunctions therein is disclosed. It is assumed that the data processing network includes a plurality of processing units coupled by communication paths in which each processing unit communicates with one or more other processing units in the data processing network by sending and receiving data packets over one or more of the communication paths. The system includes probes and a local processor for creating modified data packets from the data packets present on the network communication paths. The modified data packets allow a central processing unit which is communication with the local processor to diagnose network errors while maintaining the security of the data contained in the original data packets.

11 Claims, 1 Drawing Sheet

NETWORK DIAGNOSTIC APPARATUS AND METHOD

BACKGROUND OF THE INVENTION

The present invention relates to testing systems for use in data processing networks.

Data processing networks in which a large number of users are joined by communication links extending over a large geographic area are becoming increasingly common. These networks consist of a collection of computers or computer terminals located at various sites. For the purposes of this discussion, the terms computer and computer terminal are defined to include any data processing unit. The computers communicate over communication paths which may include one or more telephone lines. Typically, a communication on one of these communication paths consists of a message sent from one network computer to another network computer. The message is formatted prior to transmission into a "packet" by adding certain, header and/or trailing information to the message. This additional information may include information defining the computer to which the information is to be sent as well as information which aids the receiving computer in interpreting the message and in verifying that the message has been properly transmitted over the network.

In addition to this packetization of the message, the message must be translated into one of a number of signaling formats before actually being sent over one of the network communication paths. The specific signaling format will, in general, depend on the specific type of communication path being used to communicate the message. For example, when a message is sent over a communication path which consists of a telephone line, each bit in the message is translated by a modem into a tone burst of a predetermined frequency which depends on whether the bit is a 1 or a 0. A similar modem at the other end of the telephone line receives these tone bursts and translates them back to digital signal levels representing the bits of the message.

When a data processing network fails to operate properly, it is often very difficult to ascertain the location and nature of the failed component. A failure may occur because of a malfunction in either the hardware or software associated with one of the computers, in one of the devices used to translate a packet from a digital format to a signaling format, or in one of the communication paths. Ascertaining the source of the malfunction is further complicated by the fact that the various pieces of equipment in the data processing network are typically supplied and serviced by different vendors with no single vendor having responsibility for the entire data processing network. As a result, the owner of the data processing network must first determine the source of the malfunction before the appropriate vendor will repair the malfunctioning component.

Testing systems for diagnosing data processing network malfunctions are known in the prior art. These systems are based on probes placed at various points in the data processing network for copying the signals present at specified points to a testing computer. These systems may also include one or more devices for generating test signals at specified points in the data processing network. The points at which signals are read or generated are usually just before or just after one of the network computers or signaling format devices. By examining the signals read at the various points in the data processing network and the response of the data processing network to the various signals generated by the test devices, the test computer determines which of the data processing network components has failed. The appropriate vendor may then be contacted to institute corrective measures.

Such prior art testing systems have three significant problems. First, a fault must be detected by one of the computers or computer operators in the data processing network. Until someone recognizes that the data processing network is not working properly, no diagnostic testing of the data processing network will be initiated. Intermittent equipment errors are very difficult to isolate. At most, the recipient of a message in the data processing network detects an error in the message. When such an error is detected, the sender of the message is notified of the error and the message is repeated. This message repeating service is often transparent to the computer operators using the data processing network. If the message is successfully received on the repeated attempt, no one is informed of the error. Such intermittent malfunctions often occur when a piece of equipment in the data processing network is just beginning to malfunction. Ideally one would like to detect such malfunctions as soon as possible and correct them before they cause the entire data processing network to be taken off line for unscheduled maintenance. In addition, if the malfunction remains at the intermittent level, it will reduce the throughput of the data processing network, since communication capacity used in repeating the erroneous messages can not be used to send new messages between the computers in the data processing network. This loss of capacity may go unnoticed for a significant period of time if a means for detecting such intermittent failures is not present in the data processing network.

Second, the prior art testing systems do not provide adequate security from eavesdropping by test personnel. The typical data processing network owner does not wish to maintain a service staff for diagnosing system failures. However, if the owner allows an outside vendor to install a testing system which can monitor the communications on the various communication paths in the data processing network, the confidentiality of the data being communicated within the data processing network may be breached. The prior art testing systems are designed to allow the test personnel full access to the data being sent and received over the various communication communication paths even though much of this data is irrelevant to detecting and isolating malfunctions in the data processing network.

Third, in general, prior art testing systems are designed to be used in testing only a very limited number of data processing networks. As a result, such testing systems include a significant amount of computer hardware which is idle when testing is not being carried out. More particularly, the probes for reading the signals at various locations in the data processing network and the devices for generating signals within the data processing network are, in general, coupled to a separate test computer system. This separate system must store data describing the data processing network to be tested and test programs tailored to that data processing network. Hence, a reasonably complex computer system must be employed. This computing capacity remains idle most of the time. Ideally, the testing system should allow this computer capacity to be used for other tasks. For example, it could be used to monitor and test several different data processing networks. In general, prior art testing systems are designed to be used in testing one data processing network.

Consequently, it is an object of the present invention to provide a diagnostic system and testing method for a data processing network which prevents the test personnel from acquiring sensitive information which is being sent and received on the various communication paths in the data processing network.

It is another object of the present invention to provide a means for detecting malfunctions prior to said malfunctions being recognized by the data processing network personnel.

It is yet another object of the present invention to provide a testing system in which the computer system used for performing the testing may be used to test a plurality of data processing networks.

These and other objects of the present invention will become apparent to those skilled in the art from the following detailed description of the invention and the accompanying drawings.

SUMMARY OF THE INVENTION

The present invention consists of a system for testing a data processing network and diagnosing malfunctions therein. It is assumed that the data processing network includes a plurality of processing units coupled by communication paths in which each processing unit communicates with one or more other processing units in the data processing network by sending and receiving data packets over one or more of the communication paths. Each of the data packets consists of a message component and a format component. The format component includes information used for detecting errors in transmission and information specifying the format of the data packet. The message component consists of information to be delivered to a processing unit. The present invention includes probes for detecting data packets at one or more predetermined points on one of the communication paths. These probes may also be used for coupling signals to the communication paths at the points in question. A local processor is coupled to these probes. This local processor receives copies of the data packets detected by the probes and specifies signals to be coupled to the communication path by the probes. The local processor includes circuitry for separating each detected data packet into its format and message components, circuitry for generating a replacement message, and circuitry for creating a modified data packet for each detected data packet. The modified data packet comprises data specifying the point at which the data packet was detected, the format component of said detected data packet, and a replacement message. The replacement message contains the information needed by the error detecting circuitry to determine whether the original data packet consisting of the format and original message components was erroneous. The local processor receives commands over a telephone circuit. It includes circuitry for storing one or more modified data packets in response to one of these received commands. The local processor also includes circuitry responsive to one of these received commands for transmitting the modified data packets over a telephone circuit. Finally, the local processor includes circuitry responsive to commands received over the telephone circuit for generating the signals to be coupled to the various communication paths by the probes.

DETAILED DESCRIPTION OF THE INVENTION

Figure 1:
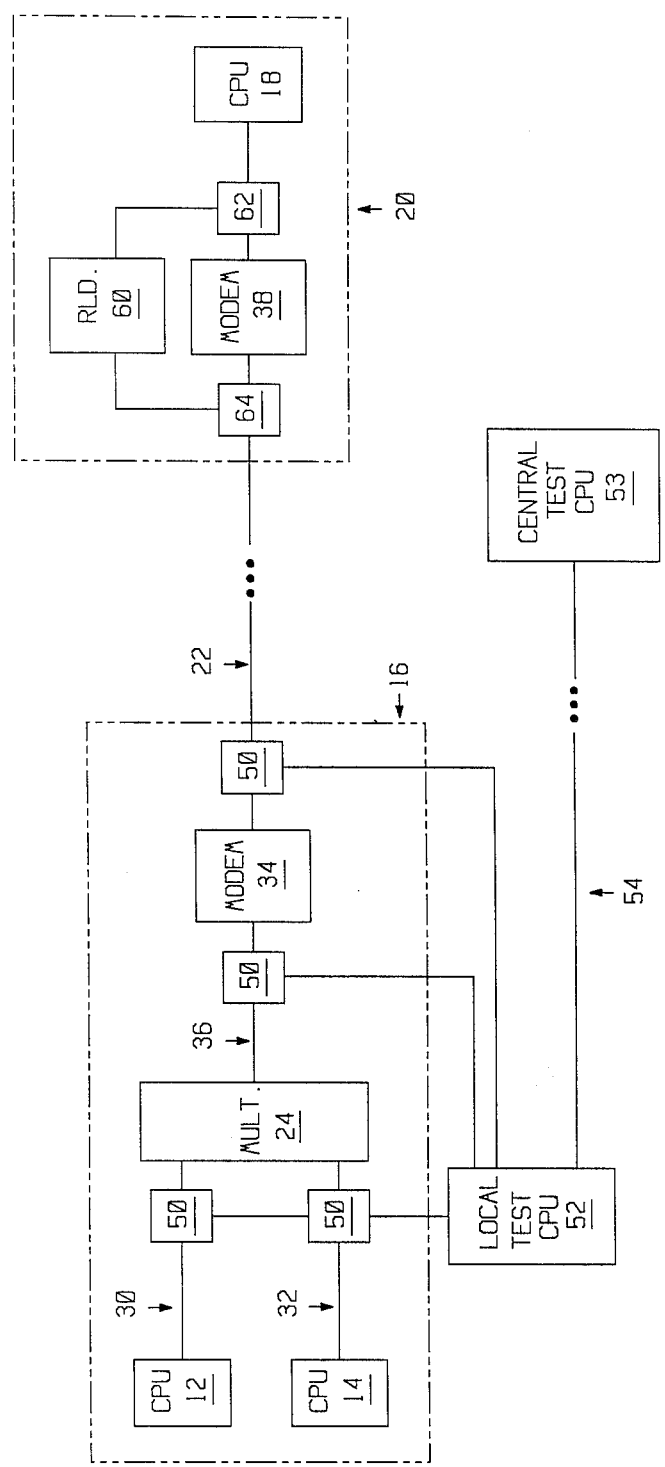
FIG. 1 is a block diagram of a typical data processing network incorporating the testing system of the present invention.

The present invention may be most easily understood by referring to a typical data processing network illustrated in FIG. 1. The data processing network consists of two computers 12 and 14 located in a facility 16 which is at a first geographic location and a third computer 18 located in a second facility 20 which is at a different geographic location. Facilities 16 and 20 are linked by a communication path 22 consisting of a telephone line. The depicted data processing network also includes a multiplexer 24 which combines the output of computers 12 and 14 prior to transmission over communication path 22 and which separates messages received on telephone line 22 for one of these computers and routes the messages in question to the correct computer. Multiplexer 24 is connected to computer 12 by a communication path 30 and to computer 14 by a communication path 32. Multiplexer 24 is coupled to the communication path 22 by a modem 34 over a communication path 36. In facility 20, computer 18 is coupled to a similar modem 38 by a communication path 40.

A malfunction in the data processing network could be the result of a malfunction in computers 12, 14, or 18, a malfunction in the multiplexer 24, a malfunction in one the modems 34 or 38, or a malfunction in any of the communication paths 30, 32, 36, 40 or 22. The present invention provides a means for isolating such a malfunction. The present invention includes a number of probes 50 placed at predetermined locations in data processing network for detecting messages sent over the various communication paths. The probes are coupled to a local test computer 52 which receives the messages detected by the probes and which generates signals which may be coupled to a communication path by the probe connected to said communication path.

The local test computer 52 is connected to a central test computer 53 by a separate telephone line 54. The central test computer 53 stores information specifying the configuration of the data processing network and specific diagnostic tests which may be performed on the data processing network using the local test computer 52. The central test computer 53 is shared between a large number of different data processing networks. The connections to the other data processing networks are typically made by telephone lines. For simplicity, these other connections have been omitted from FIG. 1.

When a malfunction is detected in one of the data processing networks serviced by the central test computer 53, an operator at central test computer 53 accesses data depicting the data processing network in which the malfunction was detected and specifies one or more tests to be performed by the local test computer 52 in the data processing network in question. These tests may include collecting data on one or more of the communication paths in the malfunctioning data processing network and transmitting that data back to the central test computer 53 for analysis. As will be described in more detail below, local test computer 52 is programmed to remove information specifying the contents of the messages on the communication paths before the data in question is transmitted to the central test computer 53. This prevents the test personnel from obtaining access to confidential information in the data processing network being tested.

In those facilities, e.g., facility 20, which do not have sufficient data processing hardware to justify the cost of installing a local test computer 52, remote loopback devices may be installed. Such a remote loopback device is shown at 60. When remote loopback device 60 detects one of a set of specified commands over communication path 22, it causes specific conductors in the communication paths to be coupled together at one of the locations connected to it. Two such locations are shown at 62 and 64, respectively. For example, the remote loopback device may connect the conductor used for receiving a message to the conductor used for transmitting a message. These connections have the effect of repeating a message received at the location in question back to the sender of that message, provided the communication path in question is operating correctly. The local test computer 52 in facility 16 controls the remote loopback device 60 by appropriate signals generated on communication path 22 using the probe 50 connected to said communication path. Such remote loopback devices are conventional in the art of network testing.

In general, the test system of the present invention will be owned and operated by an entity which is independent of the entities which own the various data processing networks service by the present invention. Hence, it is important that the data transmitted from a data processing network to the central test computer 53 not contain information which the data processing network owner views as confidential. The local test computer 52 has access to all of the messages being transmitted and received on the communication paths which it monitors using the probes 50. A given such message is transmitted as a data packet consisting of two components, a message component and a format component. The format component includes information used for detecting errors in transmission and information specifying the format of the data packet. The message component consists of the actual information being communicated between the two computers.

Typically, the information which is used for detecting errors includes one or more check sums which are used to detect transmission errors. For example, the format component may include a check sum which is calculated by adding the numerical values corresponding to each of the characters in the data packet, including the message component thereof. Typically, the check sum is the least significant part of the sum of all of these numerical character values. This reduces the amount of information which must be placed in each format component while still allowing essentially all of the common transmission errors to be detected. The check sum is calculated by the transmitting computer when the data packet in question is assembled. The receiving computer then recalculates the check sum when it receives the data packet. If the recalculated value does not match the value stored in the format component, an error has occurred in the transmission of the data packet between the transmitting and receiving computers. When this occurs, the receiving computer sends a message to the transmitting computer requesting that the message be repeated.

A check sum error could be the result of a malfunction in the transmission system or a malfunction in either the transmitting or receiving computers. To ascertain which of these possible error sources is responsible for the detected error, the central test computer 53 must be able to examine the data packet that was transmitted by the transmitting computer and the data packet that was received by the receiving computer.

For the purposes of diagnosing data processing network malfunctions, the actual content of the message component is irrelevant. At most, the central test computer 53 needs the contribution to the check sum provided by the message component to ascertain if the computer which made up the data packet is functioning properly. Any replacement message which will produce the same check sum as the original message will be sufficient to allow the central test computer to perform its functions. Hence, when the local test computer 52 records a data packet, a modified data packet is stored. The modified data packet consists of information specifying the point in the network at which the data packet was detected, the format component of the original data packet, and a replacement message having the same check sum as the original message. The information in the replacement message is not related to the information in the original message. Preferable, the replacement message consists of the smallest number of characters which produce the same check sum as the original message together with one or more characters specifying a character count which consists of the number of characters in the original message. The character count allows the test system to detect errors which are the result of characters being lost in transmission. Such a modified data packet is devoid of proprietary information, and hence, the data processing network owner need not be concerned about the security of his confidential information.

From the above example with reference to the check sum, it will be apparent to those skilled in the art that any replacement data packet which allows the local test computer 52 to determine if the data packet detected at a particular point in the data processing network contains transmission errors would be sufficient. The important feature of the present invention, is that the replacement message contains information which specifies whether the data packet has transmission errors without specifying the actual content of the message.

Before the central test computer 53 can be used to diagnose a data processing network malfunction, the central test computer staff must be alerted to the existence of such a malfunction. In the typical prior art diagnostic system, one of the data processing network owner's employees detects a system malfunction in the course of the employee's use of the data processing network or the malfunction is detected during routine maintenance tests of the data processing network. There are a number of intermittent malfunctions which will not be detected in this manner and which affect the overall performance of the data processing network. For example, if one of the communication paths has a faulty connector which intermittently breaks the connection on one of the conductors in the communication path, a message will be improperly transmitted. When this occurs, the improper message will be detected by the receiving computer which will cause the message to be repeated. Typically, if the message is successfully repeated within some predetermined number of trials, no note of the malfunction in question is made. Although this type of malfunction does not cause any data packets to be lost, it does reduce the capacity of the data processing network, since the communication path and computers in question are occupied in the unproductive work of repeating messages. In addition, if the malfunction becomes worse, it may lead to an interruption of the communication path resulting in the data processing network being taken out of service. Ideally, a data processing network test system should be able to detect such intermittent failures and alert the central test computer 53. The test system of the present invention provides an alarm system for accomplishing this.

In principle, the local test computer 52 could examine each data packet as it passes one or more of the probes 50. If improper data packets were detected more than some specified number of times at a given probe location, it would then alert the central test computer 53. However, in a large data processing network, the computational capacity needed to perform such a monitoring functions at all probe locations simultaneously is prohibitively expensive.

Furthermore, a transmission error may occur even though the data packet in question is does not contain a check sum error. A typical communication path has conductors for transmitting and receiving data packets and conductors for controlling the flow of information between the devices on each end of the communication path. If the conductors used for flow control, or the devices connected to these conductors, malfunction, a data packet may be lost. For example, this would occur if the sending computer sends a data packet to a receiving computer that was not ready to receive the data packet. Normally, the receiving computer would signal its lack of readiness by a signal on one of the flow control conductors. If the conductor in question is malfunctioning, the transmitting computer may send the message at a time when the receiving computer is not "listening". In this case, the local test computer 52 would detect an error free data packet on the communication path even though the data processing network was malfunctioning.

Finally, there are data processing networks in which the data is not placed in packets with check sums before being transmitted. For example, data may be transmitted over a transmission path as ASCII characters with no error detection at all. In such systems, errors must be detected by some means other than check sums.

The present invention provides a means for detecting malfunctioning communication paths which does not depend on finding an erroneous message on the communication paths in question. The alarm system of the present invention may be most easily understood with reference to a very simple serial communication path which uses five conductors connecting two computers referred to as A and B, respectively. One of these conductors is a signal ground lead. Two of the remaining four conductors are used for the actual transmission of data packets. One conductor is used to send data packets from A to B and will be referred to as A-SEND. The other is used to send data packets from B to A, and will be referred to as B-SEND. A data packet is sent one bit at a time at a predetermined speed. A bit having the value 0 is represented by one potential, and a bit having the value 1 is represented by a second potential. During the transmission of a data packet, the potential on such a data packet transmission conductor would switch between the two potentials in question at a maximum rate equal to the predetermined frequency. The actual rate at which the potential on the conductor toggles will depend on the data being sent. However, a minimum frequency can be defined, since each data packet is known to have bits equal to both 1 and 0. The potential pattern in which the potential switches between two defined potentials at a frequency which varies between two predetermined frequencies will be referred to as toggling.

The remaining 2 conductors in this simple example are used for flow control. One conductor, which will be referred to as B-READY, is controlled by B and is used to signal A that B is ready to receive a data packet from A. The other conductor, which will be referred to as A-READY, is controlled by A and is used to signal B that A is ready to receive a data packet from B. Each of these conductors will, in general, have one of two predetermined potential, one indicating that the controlling computer is ready, and one indicating that the controlling computer is not ready.

When viewed over a short time interval, each of the above described four signal conductors could be classified as being in one of three states. The first state is characterized by the conductor in question being at one of the above mentioned two potentials. The second state is characterized by the conductor being at the other of said potentials. The third state is characterized by the potential on the conductor toggling between said two potentials. It will be apparent to those skilled in the art that the time interval over which the potential pattern is observed must be long enough to distinguish between a conductor at a single potential and a conductor that is toggling.

These three states on each of the four conductors may be represented as a single four "digit" trinary number. Each digit of the number may take on the values 0 through 2. Each digit represents the state of one of the conductors. For example, the number 2010 would indicate that the A-SEND conductor was toggling, the B-SEND conductor is at the first potential, the B-READY conductor is at the second potential, and the A-READY conductor is at the first potential. This pattern of potentials is consistent with A sending a message to B. The first conductor used for sending a data packet from A to B is toggling. The second conductor used for sending a data packet from B to A is at the first potential, since nothing is being sent on that conductor. The third conductor which used by B to signal A that B is ready to receive a message is at the second potential, indicating that B is ready. And, the fourth conductor which used by A to signal B that it is ready to receive a message is at the second potential indicating that A is not ready to receive, since A is in the process of sending a message.

In this simple example, there are 81 possible values for this four digit trinary number. These can be divided into values which represent possible states of a correctly functioning communication path and those which represent a malfunctioning communication path. For example, the value 2000 indicates that A is sending a data packet to B when B is not ready. This indicates that a malfunction is occurring in the data processing network on the communication path in question. The value 2010 described above is an example of a value representing a correctly functioning communication path.

In general, the number of conductors carrying useful information about the state of the communication path is greater than the four described with reference to the above simple example. The additional conductors are used either for more complex flow control or for transmitting data packets in a parallel format, as opposed to the simple bit serial format described above. Also, the number of conductors will, in general, be different for different data paths in a data processing network. However, it will be apparent to those skilled in the art that an N digit number may be defined for each communication path, where N is the number of conductors carrying useful information.

It will also be apparent to those skilled in the art that more than three states could be defined for each conductor. For example, a fourth state indicating that none of the above three states was detected could be added. In addition, several toggling states could be defined. Each toggling state would correspond to the potential on the conductor switching between the two potential values at a frequency which was in one of a set of predetermined different frequency ranges. The frequency range which included the observed switching frequency would then define the state of the conductor. In this case the N "digit" number would have a radix equal to the number of possible states rather than a radix of 3 as described with reference to above example.

The preferred embodiment of the present invention uses this characterization scheme to provide the alarm function described above. The probes 50 include circuitry to define a state for selected conductors in the communication path to which said probes are coupled. These state values are used to define a diagnostic number having one "digit" for each of the so selected conductors. At the end of predetermined time intervals, one such diagnostic number is read by the local test computer 52 for each probe connected to a conductor carrying useful information. The value of each of the diagnostic numbers is compared against a list of "illegal" numbers stored in the local test computer 52. If a probe detects a diagnostic number which is in this list, an alarm signal is generated by the local test computer 52. This alarm signal is preferably sent directly to the central test computer 53. It will be apparent to those skilled in the art that an alternative procedure in which the diagnostic numbers are compared with a list of "legal" numbers and the alarm sounded in the event that a given diagnostic number is not in said list would also allow the detection of errors.

This method of detecting malfunctions requires significantly fewer computations than methods which rely on check sums. The states assigned to each of the conductors correspond to the outputs of conventional analog circuits. For example, a state indicating that the conductor potential was toggling with a switching frequency in a particular frequency band may be detected with a band-pass filter tuned to the frequency range in question. Hence, the local test computer 52 need only compare the detected diagnostic number with a list of illegal diagnostic numbers. The number of illegal states, S, will depend on the type of communication path and the communications protocol being used. If there are S numbers in a list, the maximum number of comparisons needed to determine if a given number is in the list is $\log_2 S$. Since, a check sum calculation requires one add operation for each byte in the data packet, this is significantly less than the computational effort required to compute a check sum.

Various modifications to the present invention will become apparent to those skilled in the art from the foregoing description and accompanying drawings. Such modifications are intended to fall within the scope of the appended claims.

What is claimed is:

1. A system for detecting and diagnosing malfunctions in a data processing network wherein a plurality of processing units are coupled by communication paths over which each processing unit communicates with one or more other processing units in said data processing network by sending and receiving data packets, each said data packet comprising a message component and a format component, said format component comprising information for detecting errors in transportation and information specifying the format of said data packet, and said message component comprising information to be delivered to a processing unit, said system comprising means for detecting data packets at a predetermined point on one of said communication paths;

local processing means coupled to said detecting means for processing said detected data packets, said local processing means comprising;

means for separating each detected data packet into format and message components;

means for generating a modified data packet for each said detected data packet, said modified data packet comprising data specifying the format component of said detected data packet and a replacement message comprising information for determining if the message component of said detected data packet was erroneously transmitted, wherein the message component of said data packet can not be ascetained from said modified data packet; and means for coupling said local processing means to a telephone line, said coupling means including means for transmitting a said modified data packet and information specifying the predetermined point at which said data packet was detected, over a telephone line in response to a signal received on said telephone line.

2. A system for detecting and diagnosing malfunctions in a data processing network wherein a plurality of processing units are coupled by communication paths over which each processing unit communicates with one or more other processing units in said data processing network by sending and receiving data packets, each said data packet comprising a message component and a format component, said format component comprising information for detecting errors in transmission and information specifying the format of said data packet, and said message component comprising information to be delivered to a processing unit, said system comprising means for detecting data packets at a predetermined point on one of said communication paths;

local processing means coupled to said detecting means for processing said detected data packets, said local processing means comprising;

means for separating each detected data packet into format and message components;

means for generating a modified data packet for each said detected data packet, said modified data packet comprising data specifying the format component of said detected data packet and a replacement message comprising information for determining if the message component of said detected data packet was erroneously transmitted;

means for coupling said local processing means to a telephone line, said coupling means including means for transmitting a said modified data packet and information specifying the predetermined point at which said data packet was detected, over a telephone line in response to a signal received on said telephone line; and means coupled to said local processing means for coupling signals to a communication path in said data processing network at a predetermined point on said communication path, said coupling means being responsive to control signals received over said telephone line.

3. A system for dectecting and diagnosing malfunctions in a data processing network wherein a plurality of processing units are coupled by communiation paths over which each processing unit communications with one or more other processing units in said data processing network by sending and receiving data packets, each said data packet comprising a message component and a format component, said format component comprising information for detecting errors in transmission and information specifying the format of said data packet, and said message component comprising information to be delivered to a processing unit, said system comprising means for detecting data packets at a predetermined point on one of said communciation paths;

local processing means coupled to said detecting means for processing said detected data packets, said local processing means comprising;

means for separating each detected data packet into format and message components;

means for generating a modified data packet for each said detected data packet, said modified data packet comprising data specifying the format component of said detected data packet and a replacement message comprising information for determining if the message component of said detected data packet was erroneously transmitted; and means for coupling said local processing means to a telephone line, said coupling means including menas for transmitting a said modified data packet and information specifying the predetermined point at which said data packet was detected, over a telephone line in response to a signal received on said telephone line, wherein said local processing means further comprises alarm means comprising means for detecting improper signal patterns on a specified one of said communication paths. and means for generating signals on said telephone line in response to detecting a said improper signal pattern.

4. The system of claim 3 wherein said specified communication path comprises a plurality of conductors, each said conductor coupling digital signals between two processing units in said data processing network, and wherein said detecting means comprises:

means for detecting said digital signals at a predetermined point on each of N selected conductors chosen from said plurality of conductors;

means for assigning one of S states to each said conductor in response to the digital signals so detected wherein S is greater than 2;

means for generating a number having radix S, said number including a plurality of digits, one said digit corresponding to each one of said N selected conductor, each said digit being determined by the state of said conductor; and means for comparing said generated number with a plurality of numbers and generating a signal if said generated number matches any of said plurality of numbers.

5. The system of claim 4 wherein S is equal to 4 and wherein said first state is assigned to a conductor having a steady potential below a first predetermined potential, said second state is assigned to a conductor having a steady potential above a second predetermined potential, said third state is assigned to a conductor having an oscillating potential, said oscillations occurring in a predetermined frequency range, and said fourth state is assigned to all other conductors.

6. In a data processing network in which a plurality of processing units are coupled to each other by communication paths, each said processing unit communicating with one or more of said other processing units by sending and receiving data packets comprising a message component and a format component, said format component comprising information for detecting errors in transmission and information specifying the format of said data packet, and said message component comprising information to be delivered to a processing unit, said data processing network including means for detecting data packets at least one predetermined location in one of said communication paths and means for coupling signals to said communication path at said predetermined location, said data processing network also including local processor means for receiving commands over a telephone circuit and executing said commands, said commands including commands for processing and storing detected data packets and commands for coupling signals to said predetermined location in said communication path, a method for detecting and diagnosing malfunctions comprising the steps of:

detecting data packets at said predetermined location in said communication path;

separating each detected data packet into format and message components;

generating a modified data packet for each said detected data packet, said modified data packet comprising data specifying the format component of said detected data packet, and a replacement message comprising information for determining if the message component of said detected data packet was erroneously transmitted, wherein the message component of said data packet may not be ascertained from said modified data packet; and transmitting data over a telephone circuit, said data specifying a modified data packet and the predetermined point at which said detected data packet was detected, in response to one of of said received commands.

7. In a data processing network in which a plurality of processing units are coupled to each other by communication paths, each said processing unit communicating with one or more of said other processing units by sending and receiving data packets comprising a message component and a format component, said format component comprising information for detecting errors in transmission and information specifying the format of said data packet, and said message component comprising information to be delivered to a processing unit, said data processing network including means for detecting data packets at least one predetemrined location in one of said communication paths and means for coupling signals to said communication path at said predetermined location, said data processing network also including local processor means for receiving commands over a telephone circuit and executing said commands, said commands including commands for processing and storing detected data packets and commands for coupling signals to said predetermined location in said communication path, a method for detecting and diagnosing malfunctions comprising the steps of:

detecting data packets at said predetermined location in said communication path;

separating each detected data packet into format and message components;

generating a modified data packet for each said detected data packet, said modified data packet comprising data specifying the format component of said detected data packet, and a replacement message comprising information for determining if the message component of said detected data packet was erroneously transmitted;

transmitting data over a telephone circuit, said data specifying a modified data packet and the predetermined point at which said detected data packet was detected, in response to one of said received commands; and coupling signals to said predetermined point in said communication path in rsponse to one of said received commands.

8. A method for detecting malfunctions in a communication path including a plurality of conductors, each said conductor coupling digital signals between two processing units in a data processing network, a method for detecting a malfunction in said communication path comprising the steps of:

detecting said digital signals at a predetermined point on N selected conductors, each said selected conductor being chosen from said plurality of conductors;

assigning one of S states to each said conductor in response to the digital signals so detected wherein S is greater than 2;

generating a number comprising a plurality of digits, one said digit corresponding to each said selected conductor, each said digit being determined by the state of said selected conductor; and comparing said generated number with a plurality of numbers and generating a signal if said generated word matches any of said plurality of numbers.

9. A means for detecting a malfunction in a communication path comprising a plurality of conductors, each said conductor coupling digital signals between two processing units, said detecting means comprising:

means for detecting said digital signals at a predetermined point on each of N selected conductors chosen from said plurality of conductors;

means for assigning one of S states to each said conductor in response to the digital signals so detected wherein S is greater than 2;

means for generating a number having radix S, said number including a plurality of digits, one said digit corresponding to each one of said N selected conductor, each said digit being determined by the state of said conductor; and means for comparing said generated number with a plurality of numbers and generating a signal if said generated number matches any of said plurality of numbers.

10. A system for detecting and diagnosing malfunctions in a data processing network comprising a plurality of processing units coupled by communication paths over which each processing unit communicates with one or more other processing units in said data processing network by sending and receiving data packets, each said data packet comprising a message component and a format component, said format component comprising information for detecting errors in transmission, including at least one check sum, and information specifying the format of said data packet, and said message component comprising information to be delivered to a processing unit, a system for detecting and diagnosing malfunctions in said data processing network comprising:

means for detecting data packets at a predetermined point on one of said communicaiton paths;

local processing means coupled to said detecting means for receiving the data packets detected by said detecting means, said local processing means comprising;

means for separating each detected data packet into said format and message components;

means for generating a modified data packet for each said detected data packet, said modified data packet comprising data specifying the format component of said detected data packet, and a replacement message having a check sum equal to that of the message component of said detected data packet, wherein said message component of said data packet may not be ascertained from said modified data packet; and means for coupling said local processing means to a telephone line, said coupling means including means for transmitting a said modified data packet and information specifying the predetermined point at which said data packet was detected, over a telephone line in response to a signal received on said telephone line.

11. A system for detecting and diagnosing malfunctions in a data processing network comprising a plurality of processing units coupled by communication paths over which each processing unit communicates with one or more other processing units in said data processing network by sending and receiving data packets, each said data packet comprising a message component and a format component, said format component comprising information for detecting errors in transmission, including at least one check sum, and information specifying the format of said data packet, and said message component comprising information to be delivered to a processing unit, a system for detecting and diagnosing malfunctions in said data processing network comprising:

means for detecting data packets at a predetermined point on one of said communication paths;

local processing means coupled to said detecting means for receiving the data packets detected by said detecting means, said local processing means comprising;

means for separating each detected data packet into said format and message components;

means for generating a modified data packet for each said detected data packet, said modified data packet comprising data specifying the format component of said detected data packet, and a replacement message having a check sum equal to that of the message component of said detected data packet;

means for coupling said local processing means to a telephone line, said coupling means including means for transmitting a said modified data packet and information specifying the predetermined point at which said data packet was detected, over a telephone line in response to a signal received on said telephone line; and means coupled to said local processing means for coupling signals to a communication path in said data processing network at a predetermined point on said communication path, said coupling means being responsive to control signals received over said telephone line.

* * * * *

UNITED STATES PATENT AND TRADEMARK OFFICE
CERTIFICATE OF CORRECTION

PATENT NO. : 4,750,175

DATED : June 7, 1988

INVENTOR(S) : William D. Brenneman, et al.

It is certified that error appears in the above-identified patent and that said Letters Patent is hereby corrected as shown below:

Column 2, line 50, after "munication" delete "communication".
Column 6, line 23, delete "Preferable" and insert therefor
   --Preferably--.
Column 7, line 16, delete "a".
Column 7, line 20, delete "is".
Column 10, line 29, delete "ascetained" and insert therefor
   --ascertained--.
Column 11, line 12, delete "communications" and insert therefor
   --communicates--.

Signed and Sealed this

Tenth Day of January, 1989

Attest:

DONALD J. QUIGG

*Attesting Officer*   *Commissioner of Patents and Trademarks*